United States Patent [19]

Okuda et al.

[11] Patent Number: 5,776,232
[45] Date of Patent: Jul. 7, 1998

[54] EMULSION INK FOR STENCIL PRINTING

[75] Inventors: Sadanao Okuda; Masato Ishikawa; Takashi Suzuki; Yoshihiro Hayashi, all of Inashiki-gun, Japan

[73] Assignee: Riso Kagaku Corporation, Tokyo, Japan

[21] Appl. No.: 818,720

[22] Filed: Mar. 14, 1997

[30] Foreign Application Priority Data

Mar. 14, 1996 [JP] Japan ................ 8-085891

[51] Int. Cl.$^6$ ................ C09D 11/02
[52] U.S. Cl. ................ 106/31.26; 106/31.65; 106/31.75
[58] Field of Search ................ 106/31.26, 31.65, 106/31.75

[56] References Cited

U.S. PATENT DOCUMENTS

| | | | |
|---|---|---|---|
| 5,389,130 | 2/1995 | Batlaw et al. | 106/31.26 |
| 5,395,435 | 3/1995 | Mizobuchi | 106/31.26 |
| 5,573,578 | 11/1996 | Okuda | 106/31.26 |
| 5,575,839 | 11/1996 | Okuda | 106/31.25 |
| 5,609,670 | 3/1997 | Okuda et al. | 106/31.26 |
| 5,637,137 | 6/1997 | Okuda et al. | 106/31.26 |
| 5,667,570 | 9/1997 | Okuda et al. | 106/31.26 |

FOREIGN PATENT DOCUMENTS

| | | |
|---|---|---|
| 61-255967 | 11/1986 | Japan. |
| 1-14284 | 1/1989 | Japan. |
| 4-132777 | 5/1992 | Japan. |
| 5-117565 | 5/1993 | Japan. |
| 7-188598 | 7/1995 | Japan. |

*Primary Examiner*—Helene Klemanski
*Attorney, Agent, or Firm*—Cushman, Darby & Cushman, IP Group of Pillsbury, Madison & Sutro

[57] ABSTRACT

A water-in-oil (W/O) emulsion ink for stencil printing is provided, which contains a water-insoluble colorant in the water phase, has the water phase dispersed finely and stably in the oil phase, and can provide prints high in printing density and glossiness. The water-insoluble colorant has an average particle size of 1 μm or less, and is constituted by particles of 1 μm or less in particle size in an amount of 50% or more on area basis of the total of the water-insoluble colorant. The emulsion ink is preferably formed by use of an emulsifier having an HLB of 1.5–6.0, and preferably contains a tertiary amine compound in the water phase as a dispersant for the water-insoluble colorant.

14 Claims, No Drawings

EMULSION INK FOR STENCIL PRINTING

BACKGROUND OF THE INVENTION

1. FIELD OF INVENTION

The present invention relates to an emulsion ink for stencil printing, and more specifically relates to an emulsion ink which is excellent in emulsion stability and can provide glossy print.

2. DESCRIPTION OF RELATED ART

Stencil printing is effected by perforating a stencil sheet to make a master, and passing inks through the perforated portions of the master to an article to be printed such as printing paper. Since the master is easy to make, stencil printing is utilized in a wide range of fields.

Conventional inks for stencil printing are usually water-in-oil (W/O) emulsion inks which contain pigments as colorants in the oil phase thereof, as disclosed in Japanese Patent Laid-open (Kokai) Nos. 255967/86, 14284/89, 132777/92 and 117565/93. Once this type of W/O emulsion ink is printed on an article such as printing paper to be printed, the oil phase, which is the outer phase of emulsion, permeates the printed article first, and then the water phase, which is the inner phase of emulsion, permeates the printed article and/or evaporates therefrom. Since the conventional W/O emulsion inks contain pigments in the oil phase, the inks are low in permeation speed. Also, due to the pigments contained the oil phase, permeation of the pigments occurs concurrently with the permeation of the oil phase, and as a result, the inks often have a problem of seeping through because pigments permeate deeply into the printed article first. Similary, this phenomenon of permeation occurs on a surface of paper, causing inks to spread on the surface of the paper and blurring the printing.

In order to overcome such disadvantages as mentioned above, a W/O emulsion ink has been suggested, in which water-insoluble colorants are dispersed in the water phase thereof, as disclosed in Japanese Patent Laid-open (Kokai) No. 188598/95. Emulsion inks usually require the water-phase to have an average particle size of 10 μm or less to keep the W/O emulsion stable. However, when water-insoluble colorants are dispersed in the water phase, the water phase tends to become large in particle size due to the structure in which water-insoluble colorants are present in the water phase which is further dispersed in the oil phase. As a result, emulsion stability is lowered, and sufficient glossiness can not be obtained on prints.

BRIEF SUMMARY OF THE INVENTION

It is an object of the present invention to overcome the above-mentioned problems on water-in-oil (W/O) emulsion inks for stencil printing, having water-insoluble colorants dispersed in the water phase thereof. It is a further object to provide an emulsion ink for stencil printing which is low in morphological changes, namely is high in emulsion stability or does not cause emulsion destruction even when it stands or is fluidified by shear, and which can further provide prints excellent in glossiness.

According to the present invention, the above object is attained by a water-in-oil (W/O) emulsion ink for stencil printing, having an oil phase and a water phase, in which a water-insoluble colorant is contained in the water phase, the water-insoluble colorant having an average particle size of 1 μm or less, and being constituted by particles of 1 μm or less in particle size in an amount of 50% or more on area basis of the total of the water-insoluble colorant.

In other words, the water-insoluble colorant dispersed in the water phase of the present emulsion ink is 1 μm or less in average particle size, and 50% or more on area basis of the total of the water-insoluble colorant is constituted by particles of 1 μm or less in particle size. Since the colorant does not contain very large particles, the emulsion is improved in stability and is not destructed even when it stands or is sheared to fluidify, so that an emulsion low in so-called structural changes is formed. By virtue of this, the water phase of the emulsion can be reduced to, for example, 10 μm or less in average particle size, and further to 1 μm or less to stabilize the emulsion.

DETAILED DESCRIPTION OF THE INVENTION

In the present emulsion ink, the oil phase, namely the outer phase, is greater in permeability and lower in surface tension than the water phase, and thus the oil phase permeates into an article to be printed earlier than the water phase, and then the water phase permeates and/or evaporates. Since the water phase does not permeate well into the inside of the article into which the oil phase has permeated, the water phase remains on the surface of the article and is dried thereon. As a result, printing density is improved, and seep through, blurring and the like of the ink are prevented. While conventional emulsion inks containing water-insoluble colorants in the oil phase are low in permeation speed of the oil phase and take much time to permeate and dry, the present emulsion ink is fast in permeation of the oil phase and thus improved in drying.

Furthermore, when the water-insoluble colorant has an average particle size of 0.5 μm or less in the present invention, not only the emulsion is stabilized as mentioned above, but also prints excellent in glossiness can be obtained. It is thought that the reason for this is since particles of the water-insoluble colorant are fine and uniform, particles of the water phase in the emulsion are stabilized in a fine and dense state, and the fine particles of the water-insoluble colorant are maintained in a dense state after they have been transferred to articles printed. Thus, printing density is improved and glossiness of prints is increased.

The water-insoluble colorant used in the present invention is not specifically limited, but may be known inorganic pigments, organic pigments and the like. As inorganic pigments, for example, oxide-based pigments such as titanium oxide, such as titanium dioxide and iron oxide-based pigments, calcium carbonate, alumina white, barium sulfate, carbon black or the like may be used. Carbon black includes lampblack, acetylene black, channel black or the like. As organic pigments, for example, soluble azo pigments, insoluble azo pigments, phthalocyanine-based pigments, condensed polycyclic compound-based pigments, or the like may be used.

As mentioned above, the average particle size of the water-insoluble colorant is 1 μm or less, preferably 0.01 to 0.5 μm or less, and particles of 1 μm or less of the water-insoluble colorant constitute 50% or more, preferably 60% or more on area basis of the total of the water-insoluble colorant. In order to obtain glossy prints, it is preferred that 90% or more on area basis of the water-insoluble colorant is 1 μm or less in particle size. Water-insoluble colorants having such average particle size and particle size distribution can readily be prepared by one of ordinary skill in the art by selecting appropriate types of dispersing apparatus, dispersion time, dispersant or the like depending upon types of colorants.

An addition amount of the water-insoluble colorant is preferably 1–30% by weight, more preferably 3–10% by weight based on the total of the emulsion ink. When it is less than 1% by weight, coloring effect on articles to be printed is insufficient, and when it is more than 30% by weight, fluidity of inks is deteriorated.

The water phase of the present emulsion ink may contain an oil-in-water (OW) emulsion of resin and/or a water soluble resin, as required. By use of these additives in the water phase, fixation of the water-insoluble colorant to articles to be printed such as printing paper can be improved.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 1–20% by weight, more preferably 2–10% by weight as solid content based on the total weight of the emulsion ink. If it is less than 1% by weight, the colorant contained in the water phase may not completely be fixed to articles to be printed. If it exceeds 20% by weight, inks form a film on perforations of a stencil sheet and often become difficult to pass the perforations when inks are left on the stencil sheet for a long time.

Furthermore, it is preferred that ionic surfactants, amphoteric surfactants, nonionic surfactants, polymeric, silicone-containing or fluorinated surfactants, or tertiary amine compounds are contained as dispersants in the water phase of the present emulsion ink, in order to improve wetting, dispersion and the like of the water-insoluble colorant in water.

Among these dispersants, tertiary amine compounds are particularly preferred. By employing tertiary amine compounds as dispersants, the water-insoluble colorant can finely and stably be dispersed in the water phase, qualities or colors of images can be improved by virtue of the fine dispersion of the water-insoluble colorant, and a W/O emulsion ink excellent in emulsion stability can be obtained. When ordinary dispersants which are polymer compounds containing such functional groups as carboxyl or sulfonic acid groups that adsorb the surface of pigments, are used, the emulsion sometimes tends to be destructed. This is because such polymer compounds may also be adsorbed by the interface between the oil phase and the water phase to deteriorate stability of the emulsion.

The tertiary amine compound used in the present invention is a compound having at least one linkage shown in formula (1):

$$-C-N-C- \quad (1)$$
$$\quad\; |$$
$$\quad\; C$$
$$\quad\; |$$

and includes a polymer compound having a tertiary amine, exemplified as follows: polyvinyl pyrrolidone shown in formula (2):

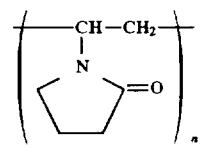

polyethyleneimine shown in formula (3):

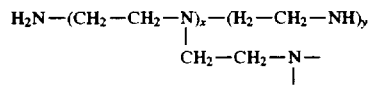

alkylolamine salts shown in formula (4):

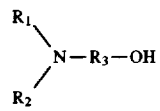

wherein $R_1$, $R_2$ and $R_3$ are alkyl groups which may be the same or different, and H may be replaced by a metallic ion, and poly-N-acryloylpyrrolidine shown in formula (5):

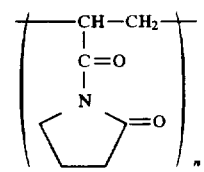

The addition amount of the tertiary amine compound is not specifically limited. Since the tertiary amine compound is usually a polymer, the more the addition amount is, the higher the viscosity is. Since dispersants, in such case, only have to be added in a minimum amount to finely and stably disperse the water-insoluble colorant in water, it is preferred that the addition amount is appropriately determined depending upon the kinds of dispersants.

Meanwhile, since some of the above surfactants, O/W emulsions of resin and water soluble resins that are added to the water phase have a nature of destructing the W/O emulsion of the ink, great care should be taken upon selection of these additives.

As required, the water phase may further contain other water soluble additives such as wetting agents, electrolytes, antifungal agents, antioxidants, water evaporation inhibiting agents and the like.

In the present invention, the oil phase basically comprises a non-volatile solvent, a volatile solvent, a resinous component, an emulsifier, and the like.

As the non-volatile solvent, can be used mineral oils such as motor oils, spindle oils, machine oils and liquid paraffin, and vegetable oils such as olive oil, castor oil and salad oils. As the volatile solvent, known solvents of the types of mineral oils and vegetable oils can be used. Proportion of non-volatile solvent to volatile solvent (i.e., non-volatile solvent/volatile solvent) varies depending upon the blending ratio of the oil phase and the water phase, but is preferably 50–95/50–5 on weight basis.

The emulsifier is used to form the W/O emulsion of the ink, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like. It is desired that these surfactants have an HLB (hydrophile-lypophile balance) of 1.5 to 6.0, preferably 2.0 to 4.0. When the HLB is lower than 1.5, surface activity is weak, and it is difficult to form a water-in-oil (W/O) emulsion with the water phase being finely dispersed. When the HLB is greater than 6.0, surface activity is high, but it is difficult to form a water-in-oil (W/O) emulsion although it can serve as an emulsifier for oil-in-water (O/W) emulsions or wetting agents.

As resinous components, mention may be made of phenolic resin, maleic resin, petroleum resin, rubber derivative resin, alkyd resin, and the like. In order to improve stability of emulsion inks in accordance with the present invention, it is desired that these resins are used in an amount of 1–30% by weight, preferably 3–15% by weight based on the total weight of the emulsion ink.

The present water-in-oil (W/O) emulsion ink can readily be made, for example, by gradually adding 90–30% by weight of the above mentioned water phase to 10–70% by weight of the above mentioned oil phase to emulsify the mixture.

aqueous dispersion of the water-insoluble colorant to the oil phase. Particle size of the water phase dispersed in the oil phase of the resultant emulsion was measured by freezing and cutting the emulsion and measuring particles of the water phase using an electron microscope JSM-5400LV (manufactured by Kabushiki Kaisha Nippon Denshi) equipped with a cryostat, and the results are shown in Table 4.

Comparative Example 4

An oil phase was obtained by mixing together the components of the oil phase shown in Table 3 by use of a mill having three rollers to disperse a water-insoluble colorant therein. Then, an emulsion ink for stencil printing was obtained by adding the water phase to the oil phase.

TABLE 1

|  | Name of water-insoluble colorant | Dispersion time (min.) | Average particle size (μm) | Proportion of particles of 1 μm or less in particle diameter (%) |
|---|---|---|---|---|
| Example 1 | Carbon black | 6.0 | 0.21 | 100 |
| Example 2 | Carbon black | 4.0 | 0.44 | 94 |
| Example 3 | Carbon black | 2.0 | 0.84 | 59 |
| Example 4 | Phthalocyanine blue | 6.0 | 0.29 | 100 |
| Example 5 | Phthalocyanine blue | 4.0 | 0.68 | 89 |
| Comparative Example 1 | Carbon black | 0.5 | 4.83 | 10 |
| Comparative Example 2 | Carbon black | 1.0 | 0.88 | 40 |
| Comparative Example 3 | Phthalocyanine blue | 1.0 | 3.29 | 19 |
| Comparative Example 4 | Carbon black | — | 0.19 | 100 |

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Examples 1–5 and Comparative Examples 1–3

Various aqueous dispersions of water-insoluble colorants were prepared by dispersing carbon black or phthalocyanine blue in accordance with the formulations shown in Tables 2 and 3 in a horizontal bead mill for the dispersion time shown in Table 1. The bead mill was a pin-type bead mill having a 4-liter vessel which was charged with zirconia beads of 1.0 mm in diameter in an amount of 80% of the volume of the vessel. Table 1 also shows an average particle size of the water-insoluble colorant in the resultant aqueous dispersion as well as a proportion on area basis of particles of 1 μm or less in particle size in the colorant. The average particle size of the water-insoluble colorant and the proportion of particles of 1 μm or less were measured by use of a centrifugal particle size measuring apparatus CAPA-700 (manufactured by HORIBA Ltd.).

An oil phase was prepared by stirring and mixing together the components shown in Table 2 or 3. An emulsion ink for stencil printing was obtained by gradually adding the above

TABLE 2

| Formulations of W/O emulsion inks (parts by weight) | | | | | |
|---|---|---|---|---|---|
| Number of Examples | 1 | 2 | 3 | 4 | 5 |
| Oil phase: | | | | | |
| Non-volatile solvent: #40 Motor oil | 18.0 | 18.0 | 18.0 | 18.0 | 18.0 |
| Volatile solvent: No.5 solvent (manufactured by Nippon Oil Co. Ltd.) | 5.0 | 5.0 | 5.0 | 5.0 | 5.0 |
| Emulsifier: Sorbitan monooleate (HLB = 3.5) | 5.0 | 5.0 | 5.0 | 5.0 | 5.0 |
| Water phase: | | | | | |
| Water-insoluble colorant: See Table 1 | 5.0 | 5.0 | 5.0 | 5.0 | 5.0 |
| Water: ion-exchanged water | 60.0 | 60.0 | 60.0 | 60.0 | 60.0 |
| Dispersant: polyvinyl pyrrolidone | 1.0 | 1.0 | 1.0 | 1.0 | 1.0 |
| Wetting agent: Ethylene glycol | 6.0 | 6.0 | 6.0 | 6.0 | 6.0 |

TABLE 3

| Formulations of W/O emulsion inks (parts by weight) | | | | |
|---|---|---|---|---|
| Number of Comparative Examples | 1 | 2 | 3 | 4 |
| Oil phase: | | | | |
| Non-volatile solvent: #40 Motor oil | 18.0 | 18.0 | 18.0 | 10.0 |

TABLE 3-continued

Formulations of W/O emulsion inks (parts by weight)

| Number of Comparative Examples | 1 | 2 | 3 | 4 |
|---|---|---|---|---|
| Volatile solvent: No.5 solvent (manufactured by Nippon Oil Co. Ltd.) | 5.0 | 5.0 | 5.0 | 5.0 |
| Emulsifier: Sorbitan monooleate (HLB = 3.5) | 5.0 | 5.0 | 5.0 | 2.0 |
| Resin: Alkyd resin | — | — | — | 8.0 |
| Water-insoluble colorant: See Table 1 | — | — | — | 5.0 |
| Water phase: | | | | |
| Water-insoluble colorant: See Table 1 | 5.0 | 5.0 | 5.0 | — |
| Water: ion-exchanged water | 60.0 | 60.0 | 60.0 | 63.0 |
| Dispersant: polyvinyl pyrrolidone | 1.0 | 1.0 | 1.0 | — |

TABLE 3-continued

Formulations of W/O emulsion inks (parts by weight)

| Number of Comparative Examples | 1 | 2 | 3 | 4 |
|---|---|---|---|---|
| Wetting agent: Ethylene glycol | 6.0 | 6.0 | 6.0 | 7.0 |

Performance tests

The emulsion inks obtained in Examples 1 to 5 and Comparative Examples 1 to 4 were evaluated on emulsion stability in accordance with the procedures shown below. Also, printing was effected by use of a stencil printing apparatus RISOGRAPH (registered trademark) GR275 (manufactured by RISO KAGAKU CORPORATION) with the above inks, and was evaluated in accordance with the procedures shown below. The results are shown in Table 4.

Emulsion stability:

(1) Heat stability: After the ink was left at a constant temperature of 50° C. for six months, lowering rate of viscosity was measured in accordance with the following equation (1):

$$\text{lowering rate of viscosity} = (V1 - V2)/V1 \qquad (1)$$

wherein V1 is viscosity before the ink is left, V2 is viscosity after the ink is left, and viscosity was measured by a Brookfield viscometer.

(2) Stability in use on printing apparatus: The above printing apparatus was charged with the above-obtained emulsion ink, and the printing drum of the printing apparatus was wound with a stencil sheet which was not perforated. Then, the printing apparatus was operated to obtain 10,000 pieces of print. In the course of printing, the ink was not able to pass the drum because there was no perforation in the stencil sheet, and thus the ink was being sheared in the drum. Then, lowering rate of viscosity of the ink was measured in accordance with the above equation (1).

Evaluation of printing:

(1) Printing density: Printing density on a solid region of print was measured using a reflection density measuring apparatus RD914 manufactured by Macbeth Corp.

(2) Glossiness: This was evaluated by observing the solid region of print with naked eyes.

TABLE 4

Results of Examples and Comparative Examples

| | Ex. 1 | Ex. 2 | Ex. 3 | Ex. 4 | Ex. 5 | C.Ex. 1 | C.Ex. 2 | C.Ex. 3 | C.Ex. 4 |
|---|---|---|---|---|---|---|---|---|---|
| Average particle size of water phase (μm) | 0.80 | 0.85 | 1.08 | 0.80 | 0.98 | 2.50 | 1.20 | 3.50 | 0.81 |
| Emulsion Stability | | | | | | | | | |
| (1) Heat stability | 0.09 | 0.15 | 0.20 | 0.11 | 0.18 | 0.40 | 0.30 | 0.50 | 0.11 |
| (2) Stability in use on printing apparatus | 0.11 | 0.15 | 0.18 | 0.13 | 0.20 | 0.35 | 0.29 | 0.44 | 0.12 |
| Evaluation of printing | | | | | | | | | |
| (1) Printing density | 1.21 | 1.20 | 1.15 | 1.19 | 1.15 | 1.13 | 1.11 | 1.10 | 1.00 |
| (2) Glossiness | (++) | (++) | (+) | (++) | (+) | (+) | (+) | (+) | (−) |

Note: "Ex." refers to Example; and "C.Ex." refers to Comparative Example.
Glossiness was observed with naked eyes, and evaluated as (++) when glossiness is found at a glance, as (−) when no glossiness is found, and as (+) when glossiness is between (++) and (−).

From Tables 1 and 4, it was found that when the water-insoluble colorant has an average particle size of 1 μm or less and contains colorant particles of 1 μm or less in diameter in an amount of 50% or more of the total of the colorant on area basis, an emulsion which is very high in stability is obtained. Furthermore, when the average particle size of the water-insoluble colorant is 0.5 μm or less, an emulsion in which the average particle size of the water phase is kept 1 μm or less is obtained, and glossy prints are provided.

According to the present invention, a W/O emulsion ink for stencil printing having a water-insoluble colorant in the water phase is provided, in which the water phase is dispersed finely and stably and which can provide prints high in printing density and glossines.

What is claimed is:

1. A water-in-oil (W/O) emulsion ink for stencil printing comprising an oil phase and a water phase, wherein a water-insoluble colorant is contained in said water phase, said water-insoluble colorant having an average particle size of 1 μm or less, and wherein water-insoluble colorant particles of 1 μm or less in particle size are present in an amount of 50% or more on area basis of the total of said water-insoluble colorant.

2. The emulsion ink for stencil printing of claim 1, comprising an emulsifier added to said oil phase, said emulsifier having an HLB of 1.5 to 6.0.

3. The emulsion ink for stencil printing of claim 2, comprising a tertiary amine compound as a dispersant in said water phase.

4. The emulsion ink for stencil printing of claim 1, in which said water-insoluble colorant has an average particle size of 0.5 μm or less, and particles of 1 μm or less in particle size are present in amount of 90% or more on area basis of the total of said water-insoluble colorant.

5. The emulsion ink for stencil printing of claim 4, said emulsion ink further comprising an emulsifier added to said oil phase, said emulsifier having an HLB of 1.5 to 6.0.

6. The emulsion ink for stencil printing of claim 5, wherein said emulsion ink further comprises a tertiary amine compound as a dispersant in said water phase.

7. The emulsion ink for stencil printing of claim 2, wherein said emulsifier has an HLB of 2.0 to 4.0.

8. The emulsion ink for stencil printing of claim 5, wherein said emulsifier has an HLB of 2.0 to 4.0.

9. The emulsion ink for stencil printing of claim 3, wherein said tertiary amine compound is a polymer compound having a tertiary amine.

10. The emulsion ink for stencil printing of claim 6, wherein said tertiary amine compound is a polymer compound having a tertiary amine.

11. The emulsion ink for stencil printing of claim 1, wherein said average particle size of said water-insoluble colorant is 0.01 to 0.5 μm or less.

12. The emulsion ink for stencil printing of claim 1, wherein said particles of 1 μm or less in particle size are present in an amount of 60% or more on an area basis of the total of said water-insoluble colorant.

13. The emulsion ink for stencil printing of claim 2, wherein said emulsifier is a nonionic surfactant.

14. The emulsion ink for stencil printing of claim 5, wherein said emulsifier is a nonionic surfactant.

* * * * *